United States Patent
Janssen et al.

(10) Patent No.: US 6,563,551 B1
(45) Date of Patent: May 13, 2003

(54) HIGH CONTRAST POLARIZING OPTICS FOR A COLOR ELECTRO-OPTIC DISPLAY DEVICE

(75) Inventors: Peter J. Janssen, Scarborough, NY (US); Sjoerd Stallinga, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 476 days.

(21) Appl. No.: 09/605,951

(22) Filed: Jun. 28, 2000

(65) Prior Publication Data
(65)

(51) Int. Cl.[7] .............................. H04N 9/31; G02F 1/00
(52) U.S. Cl. ....................... 348/759; 348/761; 353/20; 349/9
(58) Field of Search .................... 348/744, 750, 348/751, 756, 757, 758, 759, 760, 761, 762, 742, 743; 353/20, 31, 33; 359/490, 493, 494, 495, 496, 634, 583; 349/5, 9; H04N 9/31

(56) References Cited

U.S. PATENT DOCUMENTS

| | | | |
|---|---|---|---|
| 5,914,817 A | 6/1999 | Browning et al. | 359/634 |
| 5,946,054 A | 8/1999 | Sannohe et al. | 348/745 |
| 6,388,718 B1 * | 5/2002 | Yoo et al. | 349/9 |
| 6,398,364 B1 * | 6/2002 | Bryars | 353/31 |

FOREIGN PATENT DOCUMENTS

| | | | |
|---|---|---|---|
| JP | 11002780 A | 1/1999 | G02B/27/18 |
| JP | 11125814 A | 5/1999 | G02F/1/1335 |
| WO | WO 9513561 | 5/1995 | G02F/1/1333 |

OTHER PUBLICATIONS

"High Brightness Color Liquid Crystal Display Projector" in IBM Technical Disclosure Bulletin, vol. 40 No. 12, Dec. 1997, pp. 165–167.

* cited by examiner

Primary Examiner—Michael H. Lee

(57) ABSTRACT

A projection-type color image display system uses a reflective liquid crystal (LC) light modulator (24) and a polarizing beam-splitter (22) for separating the incoming and reflected light. Light from the source arrives on a first axis (28) and is reflected outward, with the imposed image, along a second axis (30) through a projection lens (26). In order to produce a high contrast image, a pre-polarizer (36, 42, 48) and/or post-polarizer (44, 50) are used to restore the selectivity and, consequently, optical system contrast for the wide "cone of acceptance" of light rays which are common in projection systems. In order to improve the system contrast, the pre- and/or post-polarizer is arranged along the first and second axis, respectively, with its polarizer absorbing axis extending parallel to the normal n of the reflective surface (34, 46) of the PBS.

7 Claims, 4 Drawing Sheets

HIGH CONTRAST POLARIZING OPTICS FOR A COLOR ELECTRO-OPTIC DISPLAY DEVICE

BACKGROUND OF THE INVENTION

The invention relates to color image display systems which employ one or more electro-optic projection-type image display devices. Such a display device serves as a light modulator, either in the transmissive or reflective mode, to control the grey level of projected light at each pixel point. More particularly, the invention relates to such a color display system having a reflective liquid crystal (LC) light valve and a polarizing beam splitter for separating the incoming and reflected light.

Color display systems are known in which light bars of different colors are sequentially scrolled across a single electro-optic light modulator panel to produce a color display. See, for example, commonly assigned U.S. Pat. No. 5,532,763, incorporated herein by reference.

These display systems are particularly suitable for displaying color images in successive frames, such as color video information, wherein each frame is composed of component color sub-frames, e.g., red, green and blue sub-frames.

These systems employ an electro-optic (LCD) light-transmissive or reflective modulator panel comprised of a row-and-column matrix array of pixels, for modulating the transmission of light in accordance with the image information signals during successive frame periods. The analog signal information is applied to the pixel columns of the array, a row at a time, during each frame period.

A similar system is also disclosed in the publication of J. A. Shimizu, "Single Panel Reflective LCD Projector", *Projection Displays V*, Proceedings SPIE, Vol. 3634, pp. 197–206 (1999), which is incorporated herein by reference. Other references which disclose such a system are the published Japanese Patent Application Nos. 09,292,160 and 10,091,886; U.S. Pat. Nos. 5,914,817 and 5,946,054; International Publication No. WO 95/13561 (Application No. PCT/US94/12289) and IBM Technical Disclosure Bulletin Vol. 40, No. 12, PP 165–167. In this type of system, a reflective LCD is used to create the image. The active area on the LCD from which the picture information is reflected consists of an array of pattern aluminum mirrors. The reflective mirrors are formed on top of the array, covering the address circuitry and pixel transistors.

An incoming illumination beam is directed to a polarizing beam-splitter or "PBS". The PBS directs a polarized beam onto the reflective LCD panel, which modulates the polarization with the picture information. The reflective LCD, in combination with the PBS, directs the picture forward through a projection lens and onto a screen.

Of all the components in the system, only the LCD panel, the PBS and the projection lens are in the imaging path. These components are therefore critical to the quality of the projected image. A typical PBS has very good polarizing contrast or "extinction" over a small angular range of about +/−1°; however, a wider angular acceptance, up to +/−12°, is possible only with a trade-off in extinction.

In order to produce a high contrast image, it is necessary for the PBS to have a high selectivity between the eigen-polarizations ("p" and "s") for the transmissive as well as the reflective case. For this reason, pre-polarizers and/or post-polarizers are used to restore the selectivity and, consequently, optical system contrast for the wide cone angles that are common in projection systems.

Commonly, sheet-type polarizers are used for this purpose, as they have very high selectivity, occupy little space and are relatively inexpensive. Grid polarizers may also be used. However, when sheet or grid polarizers are placed in the light path, they produce an eigen-polarization field that is generally different than the eigen-polarization field of the PBS. Since the two fields do not match, the resulting selectivity is reduced and the system contrast is diminished.

SUMMARY OF THE INVENTION

It is a principal object of the present invention to provide a color image display system which includes a reflective liquid crystal light modulator and a polarizing beam-splitter (PBS), arranged in front of the light modulator, for separating incoming and reflected light, which avoids the problems described above.

This object, as well as other objects which will become apparent from the discussion that follows, are achieved, in accordance with the present invention, by providing a particular arrangement of the pre-polarizer or post-polarizer and the polarizing prism (PBS) wherein the fields of both polarizer types can be made the same and, thus, the system contrast can be improved.

More particularly, the present invention comprises:

(a) a light source producing a beam of light along a first axis;

(b) a reflective light modulator having an array of addressable pixels for modulating the polarization of light reflected from the pixels in accordance with display signals applied to the pixels, the array of pixels of the light modulator forming a substantially planar first surface arranged to receive and reflect the beam of light in a direction substantially perpendicular to the first surface;

(c) an electronic circuit for repeatedly addressing the array of pixels of the light modulator with display signals corresponding to a picture image;

(d) a projection lens having an optical axis aligned along a second axis, the projection lens being arranged to receive and project light onto a display screen, the second axis intercepting the first axis;

(e) a polarizing beam-splitter (PBS), having a reflective/transmissive surface with a normal n, interposed on both the first and second axes to intercept the beam of light from the source and to pass the beam to the light modulator, and to intercept the reflected light from the light modulator and to pass the reflected light with a given polarization to the projection lens along the second axis; and (f) a polarizer arranged along one of the first and second axes to receive and polarize the beam of light, the polarizer having a polarizer absorbing axis which extends parallel to the normal n.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
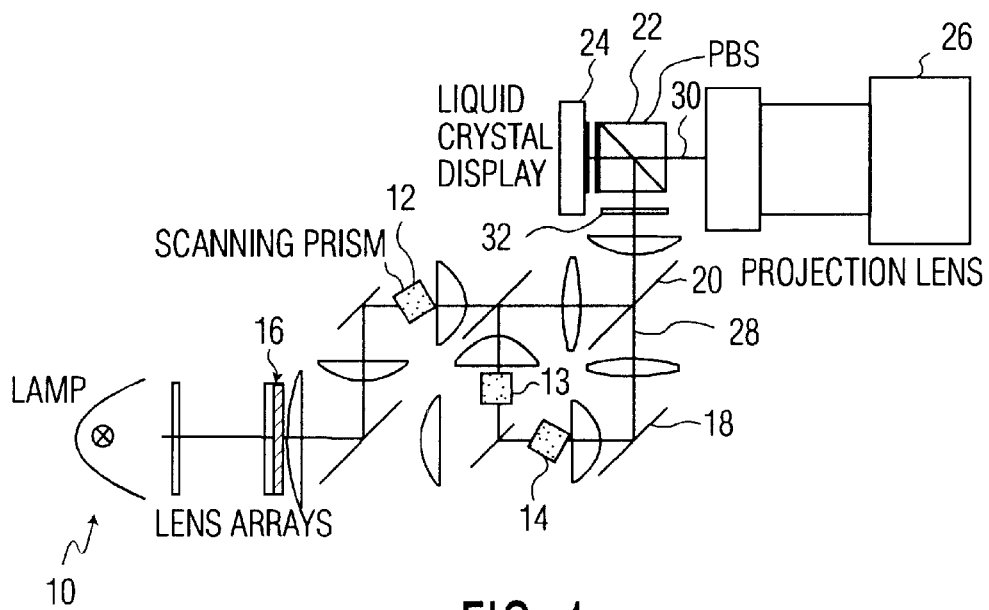
FIG. 1 is a schematic diagram of the optical system of a color image display device of the type to which the present invention relates.

The preferred embodiments of the present invention will now be described with reference to FIGS. 1–8 of the drawings. Identical elements in the various figures are designated with the same reference numerals.

FIG. 1 shows a "color scrolling" optical arrangement as is described in the aforementioned article by Shimizu: "Single Panel Reflective LCD Projector". This optical system gains the advantages of using a single reflective LCD modulator or "panel" without sacrificing system light efficiency. With the scrolling color system, all three colors are present on the panel at all times. White light from a lamp 10 is split into constituent red, green and blue beams. The colored beams illuminate the panel as spacially separated stripes of light which scroll across the panel from top to bottom. As one color scrolls off the bottom of the panel, it appears immediately again at the top.

To create the color image, the LCD is effectively addressed at three different places simultaneously. Data for a given color, for example, green, is written to a row just after passing of the previous color, blue. The green band then illuminates the pixel. The panel is addressed at three places, and these address rows shift downward in synchronism with the illumination pattern. In practice, only one row is active at a time so the active row jumps around the panel from top, to center, to bottom. The address then returns to the top and the sequence repeats with each of the row numbers incremented by one on the next pass.

As compared to a three panel system and a color wheel system, the scrolling color system has full spectral efficiency so it may be as bright as the three panel system.

In comparison to a color wheel system, the scrolling color architecture has nominally three times the spectral efficiency.

The optical path makes use of three rotating scanning prisms 12, 13 and 14, one for each primary color, blue, green and red, respectively. Lens integrator arrays 16 are used to shape and homogenize the distribution to form the wide illumination stripe. The light path is split into blue, green and red color channels using dichroic color filters, with one rotating prism 12, 13, 14 in each channel. The three prisms are offset in phase relative to each other by 30 degrees or ⅓ of a complete vertical scan. This phase offset creates the spacial separation of colors at the LCD panel. Dichroic color filters 18, 20 are used to recombine the colors into a single illumination beam. The beam then encounters a polarizing beam-splitter (PBS) 22. The PBS 22 directs the polarized beam onto the reflective LCD panel 24, which modulates the polarization with the picture information. The LCD panel, in combination with the PBS, directs the picture forward through a projection lens 26 and onto a screen (not shown).

Figure 2:
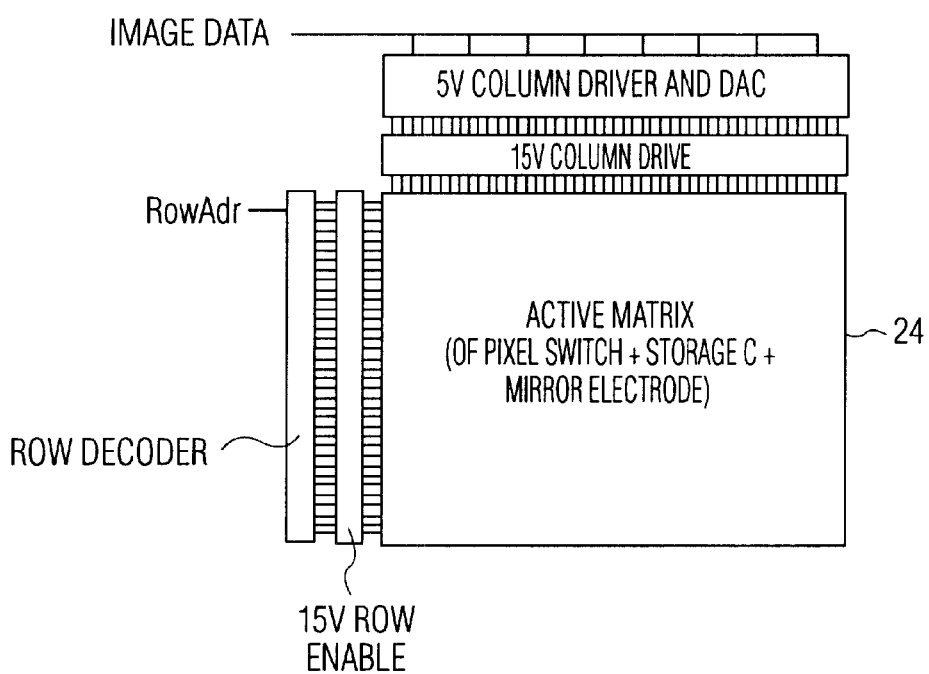
FIG. 2 is a block diagram showing an electronic circuit for addressing rows and columns of pixels in a reflective light modulator.

The reflective LCD panel is the most critical element of the system. The panel must meet resolution, speed and architectural requirements of the single panel system. Details of this panel are described in the aforementioned article of Shimizu, "Single Panel Reflective LCD Projector". Suffice it to say that the panel 24 has an active matrix or array of addressable pixels arranged in rows and columns, as shown in FIG. 2, which modulate the polarization of light reflected from the pixels in accordance with a voltage level or signal applied to each pixel. The pixels are addressed column by column and row by row and provided with the display signals representing the image data.

In the system shown in FIG. 1, the scrolling light beam is applied to the PBS 22 along a first axis 28 and is reflected toward the LCD panel 24 along its second axis 30. These two axes may, but do not have to be, perpendicular to each other. The light beam directed toward the PBS 22 along the first axis 28 is passed through a sheet polarizer disposed with its plane parallel surfaces perpendicular to the axis 28. If one were to assume that all of the light rays in the incoming beam were parallel to the axis 28, the PBS 22 and liquid crystal display 24 would accurately control the amount of light passed through the PBS to the projection lens 26. If the polarization of the incoming light were not changed by the LCD panel 24, 100% of this light would be reflected back into the incoming beam by the PBS. To the extent that the polarization has been changed by the LCD panel 24, this light would pass through the PBS 22 to the projection lens.

However, the optical system of FIG. 1 permits light rays with a "cone of acceptance" of up to 12% to impinge upon the PBS 22. Since light rays traveling in different directions through the polarizer 32 will be polarized in different directions of the vector s, the LCD panel cannot accurately change the polarization of this light. In particular, some of the light which should have been reflected toward the incoming beam is passed through the PBS to the projection lens, and some of the light which should have been passed through the PBS to the projection lens is reflected back toward the light source. In other words, the quality of "extinction" or contrast is directly affected by the wide cone of acceptance.

Figure 3:
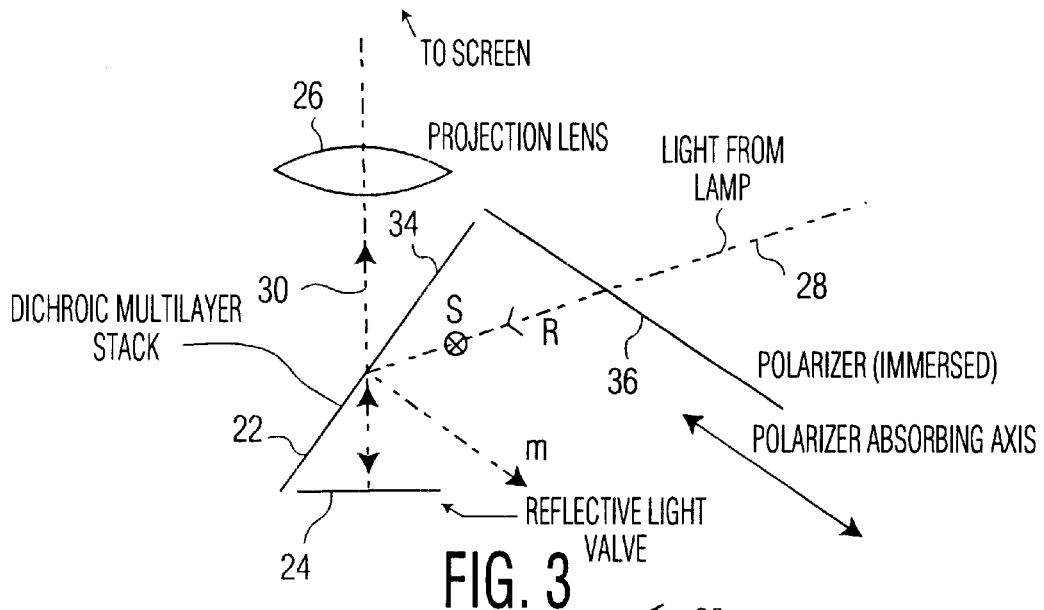
FIG. 3 is a representational diagram showing the arrangement of a sheet polarizer, a polarizing beam-splitter and a reflective light modulator according to a first preferred embodiment of the present invention.

FIG. 3 illustrates how this problem may be solved according to the invention by arranging the absorbing axis of a sheet or grid polarizer at a particular angle with respect to the plane of reflection of the PBS.

With a particular arrangement of the (in this case) sheet polarizer 36 and PBS prism 22, the fields of the prism and the sheet polarizer can be made to conform. This enhances the prism's selectivity in reflection. Whereas it is relatively easy for a dichroic coating to achieve very high selectivity between the transmitted modes, it is next to impossible to do the same for the reflected modes.

Combining these two findings, one can base a high-contrast system on a dichroic prism coating, optimized for maximum selectivity in transmission only, whereby a single sheet polarizer in the properly chosen orientation provides the high selectivity in reflection.

As shown in FIG. 3, the dichroic, polarizing beam-splitter 22, formed of a dichroic, multilayer stack, has a plane reflective surface 34 with a normal n. Light from the source enters along axis 28 and is reflected downward along axis 30 to the reflective LCD light modulator 24.

The sheet polarizer 36, having opposite plane parallel surfaces is disposed along the first axis 28 with its polarizer absorbing axis parallel to the normal n. This absorbing axis of the polarizer 36 is oriented such that the eigen-polarization "s" is perpendicular to the normal n and parallel to the reflective surface 34 of the PBS 22.

The pre-polarizer 36 is a single sheet which is immersed in the same medium as the PBS dichroic stack.

The sheet polarizer can be described as a uni-axial, optically an-isotropic, material with maximum absorption in the direction parallel to the optical axis.

The transmitted polarization is defined by:

$$\overline{E} = \frac{R \times \overline{A}}{\overline{R \times \overline{A}}} \quad (1)$$

where the unit vector E represents the field of the transmitted polarization, unit vector R, the light ray, and unit vector A, the absorbing axis direction of the polarizer.

The dichroic prism coating discriminates between $\overline{S}$ & P (eigen) polarization states, defined by:

$$\overline{S} = \frac{R \times \overline{N}}{\overline{R \times \overline{N}}} \quad (2)$$

$$P = \frac{R \times \overline{S}}{\overline{R \times \overline{S}}} \quad (3)$$

with unit vector $\overline{N}$ representing the normal of the dichroic plane.

If the two vectors $\overline{A}$ and $\overline{N}$ are aligned, it follows from (1) and (2) that vectors $\overline{E}$ and $\overline{S}$ must also be parallel; i.e., the polarization field of the two polarizers must conform.

Figure 4:
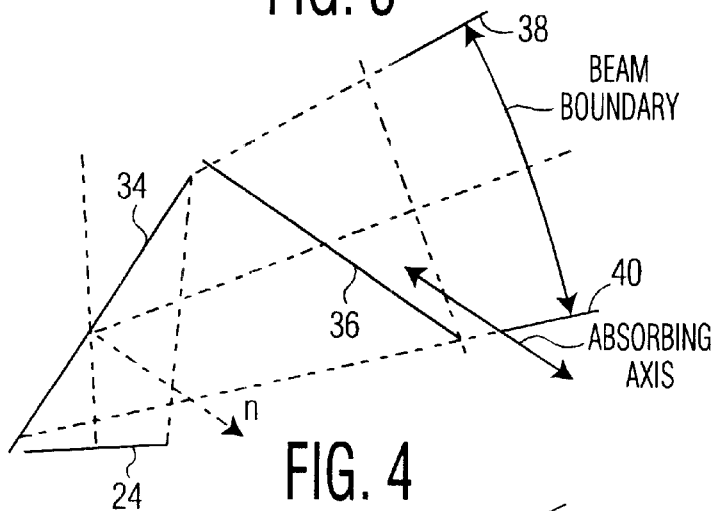
FIG. 4 is a representational diagram illustrating the cone of rays of a light beam received from the light source in the embodiment of FIG. 3.

FIG. 4 illustrates this principle as applied to the first preferred embodiment of the invention shown in FIG. 3. The beam boundary defined by the cone of acceptance of the imaging system is indicated by the boundary lines 38 and 40. By arranging the absorbing axis of the pre-polarizer 36 parallel to the normal n of the PBS reflecting surface 34, the light passed through the sheet polarizer is, from the beam-splitter's perspective, purely "s" polarized light for all light rays, regardless how large a cone angle is used.

Figure 5:
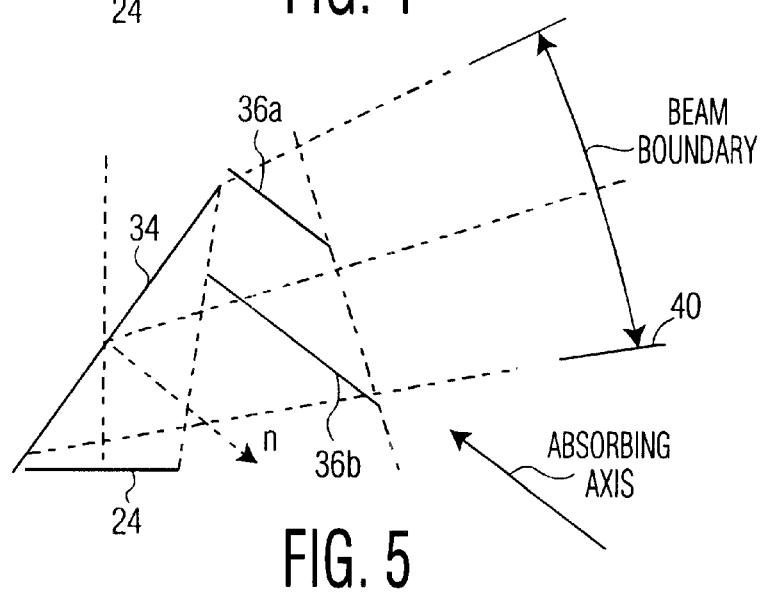
FIG. 5 is a representational diagram showing the arrangement of multiple, staggered polarizing sheets, a polarizing beam-splitter and a reflective light modulator in a space-saving configuration according to a second preferred embodiment of the present invention.

FIG. 5 shows a second embodiment of the invention which uses staggered pre-polarizer sheets 36a and 36b to reduce space.

Again, the polarizer absorbing axes of these sheets is aligned with the normal n to the reflective surface 34. However, this embodiment results in some light loss where the beam must pass through two polarizers.

Figure 6:
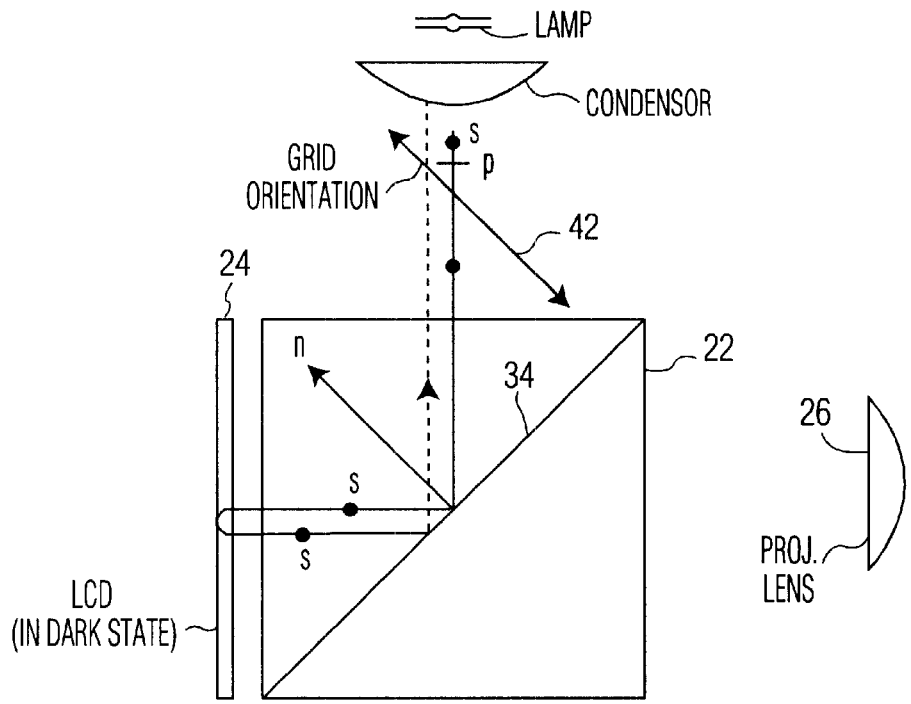
FIG. 6 is a representational diagram showing a grid polarizer, a polarizing beam-splitter and a reflective light modulator according to a third preferred embodiment of the present invention.

FIG. 6 shows a third embodiment of the invention which uses a grid pre-polarizer 42 which passes only "s" polarized light that is perpendicular to the grid direction. Because the grid orientation is parallel to the normal n of the reflective surface in the dichroic PBS 22, the electrical vector S, which is perpendicular to the grid wires, also remains perpendicular to the plane of the ray as it is reflected at the surface 34.

Figure 7:
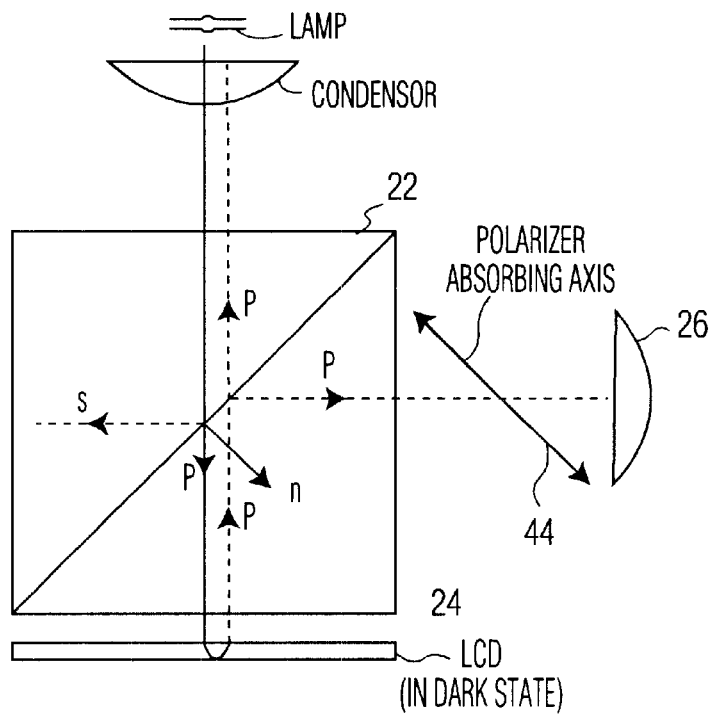
FIG. 7 is a representational diagram showing the arrangement of a sheet or grid polarizer, a polarizing beam-splitter and a reflective light modulator according to a fourth preferred embodiment of the present invention.

FIG. 7 shows a fourth embodiment of the present invention wherein the order of the elements is reversed in the imaging path. In this case, a post-polarizer 44 (either a sheet or grid-type polarizer) is disposed between the PBS 22 and the projection lens 26.

The PBS effectively rejects the "s" component of the incoming light, transmitting only "p" polarized light. In the dark state, the LCD 24 reflects the light without changing its polarization. The PBS reflects part of the "p" polarized light, which would decrease contrast if a post-polarizer were not used. The post-polarizer 44 effectively absorbs this "p" polarized light and, thus, restores the contrast.

Figure 8A:
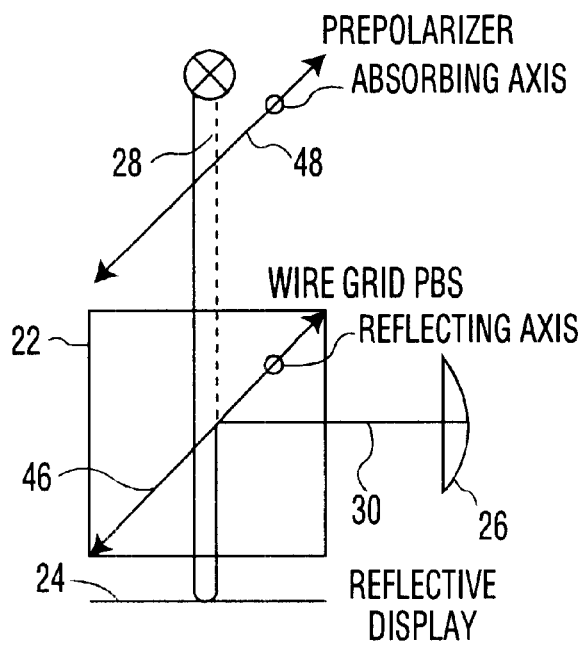
FIG. 8, comprised of FIG. 8A and FIG. 8B, are representational diagrams showing an arrangement according to a fourth and a fifth preferred embodiment, respectively, of the present invention.
Figure 8B:
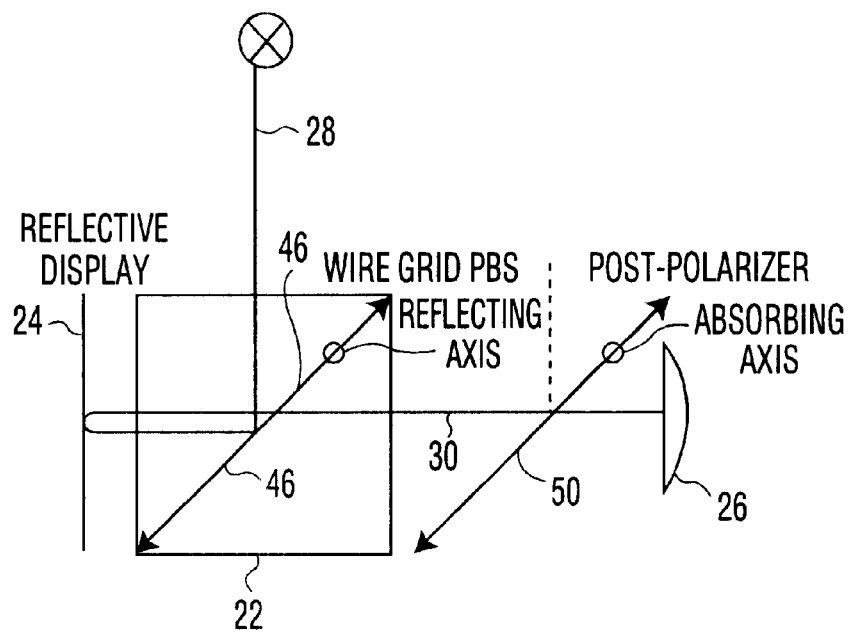

In the four preferred embodiments of the invention described above, the PBS 22 is formed of a dichroic, multilayer stack having a reflective surface 34. FIGS. 8A and 8B illustrate fifth and sixth embodiments of the invention, respectively, which use a wire grid-type PBS. In both of these embodiments, the grid wires of the PBS are parallel to the (nominal) plane of incidence, wherein the light that is transmitted through the wire grid vibrates in a plane perpendicular to the wires. The absorbing axis of the pre-polarizer 48 (FIG. 8A) the post-polarizer 50 (FIG. 8B) is oriented parallel to the grid wires 46 of the PBS 22.

There has thus been shown and described a novel high contrast polarizing optics for a color electro-optic display device which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. For example, the invention may employ either pre-polarizers or post-polarizers (or both) of any known type (e.g., sheet or grid type polarizers). Such polarizers may be disposed in air or immersed in a medium together with the PBS. All such changes, modifications, variations and other uses and applications which do not depart from the spirit and scope of the invention are deemed to be covered by the invention, which is to be limited only by the claims which follow.

What is claimed is:

1. An image display system comprising:

(a) a light source producing a beam of light along a first axis;

(b) a reflective light modulator having an array of addressable pixels for modulating the polarization of light reflected from the pixels in accordance with display signals applied to the pixels, the array of pixels of the light modulator forming a substantially planar first surface arranged to receive and reflect the beam of light in a direction substantially perpendicular to said first surface;

(c) an electronic circuit for repeatedly addressing the array of pixels of the light modulator with display signals corresponding to a picture image;

(d) a projection lens having an optical axis aligned along a second axis, the projection lens being arranged to receive and project light onto a display screen, said second axis intercepting said first axis;

(e) a polarizing beam-splitter (PBS), having a reflective/transmissive surface with a normal n, interposed on both the first and second axes to intercept the beam of light from said source and to pass the beam to said light modulator, and to intercept the reflected light from said light modulator and to pass the reflected light with a given polarization to said projection lens along said second axis; and (f) a polarizer arranged along one of the first and second axes to receive and polarize the beam of light, the polarizer having a polarizer absorbing axis which extends parallel to the normal n.

2. The image display system defined in claim 1, wherein said polarizer is disposed on said first axis between said light source and said PBS.

3. The image display system defined in claim 1, wherein said polarizer is disposed on said second axis between said PBS and said projection lens.

4. The image display system defined in claim 1, wherein said polarizer is a sheet-type polarizer.

5. The image display system defined in claim 1, wherein said polarizer is a grid-type polarizer.

6. The image display system defined in claim 1, wherein said polarizer and said PBS are immersed in a liquid medium.

7. The image display system defined in claim 1, wherein the PBS includes a dichroic multilayer stack.

* * * * *